(12) United States Patent
Caruso et al.

(10) Patent No.: US 7,801,942 B2
(45) Date of Patent: Sep. 21, 2010

(54) RICH MEDIA FILE FORMAT AND DELIVERY METHODS

(75) Inventors: Robert M. Caruso, Newberg, OR (US); Konstantin J. Balashov, Newberg, OR (US)

(73) Assignee: Marger Johnson & McCollom, P.C., Portland, OR (US)

( * ) Notice: Subject to any disclaimer, the term of this patent is extended or adjusted under 35 U.S.C. 154(b) by 316 days.

(21) Appl. No.: 11/858,045

(22) Filed: Sep. 19, 2007

(65) Prior Publication Data
US 2008/0010277 A1 Jan. 10, 2008

Related U.S. Application Data

(62) Division of application No. 09/772,541, filed on Jan. 29, 2001, now Pat. No. 7,412,478.

(60) Provisional application No. 60/178,482, filed on Jan. 27, 2000, provisional application No. 60/199,781, filed on Apr. 26, 2000, provisional application No. 60/230,043, filed on Sep. 1, 2000.

(51) Int. Cl.
*G06F 17/30* (2006.01)
(52) U.S. Cl. .................. 709/200; 709/204; 709/205; 709/206; 709/219; 709/227; 726/24; 726/36; 726/22; 725/113; 725/135; 725/112; 725/46

(58) Field of Classification Search ......... 709/217–219, 709/200, 204–206, 227
See application file for complete search history.

(56) References Cited

U.S. PATENT DOCUMENTS

| | | | |
|---|---|---|---|
| 5,880,388 A | | 3/1999 | Kajiyama et al. |
| 5,905,988 A | * | 5/1999 | Schwartz et al. .......... 707/104.1 |
| 6,011,537 A | * | 1/2000 | Slotznick .................... 715/733 |
| 6,078,921 A | | 6/2000 | Kelley |
| 6,157,935 A | * | 12/2000 | Tran et al. ................... 715/202 |
| 6,272,484 B1 | | 8/2001 | Martin et al. |
| 6,721,784 B1 | | 4/2004 | Leonard et al. |
| 6,832,084 B1 | | 12/2004 | Deo et al. |
| 6,834,276 B1 | | 12/2004 | Jensen et al. |

* cited by examiner

*Primary Examiner*—Jude J Jean Gilles

(57) ABSTRACT

A rich media file is a self-contained file, including both the information to be viewed by a user and the viewer that displays the information to the user. The information can be formatted however the client likes: for example, the information can be split across several pages, and can include text and still and animated images. There can also be web links to pages on a network, and e-mail forms to simplify sending an e-mail message to the client. The rich media file can include viewing limitations, so that only the proper password can unlock the file, or that the rich media file will automatically expire after a specified condition occurs. The rich media file also assists the user in obtaining the latest version of the rich media file, by offering to retrieve a newer version for the user.

15 Claims, 16 Drawing Sheets

| Tags | Description |
|---|---|
| <filename></filename> | This tag specifies the output file name. Currently if this tag is omitted a default file name is used. |
| <name></name> | The name tag specifies the parent's name that this object is associated with. |
| <object></object> | The object tag contains information an object on a page. Provided there are objects with the same name outside <record ></record> tags they will be placed on separate pages. Thus a new page is created from the template page. They will be placed on the pages in first in, first out order. |
| <image></image> | If the image tag is not found for an object the default image for the object as defined in the template is used. This tag is ignored for rich textboxes, link boxes, backgrounds, and textboxes. This tag is ignored if found outside of <object></object> or <objectdefault> </objectdefault> tags. The image must have a name. |
| <imgdata></imgdata> | The imgdata tag contains the data as HEX. This tag is ignored if found outside of <image></image> tags. This data is spooled to disk and then reloaded thus if an image is needed many times it only needs to be included once. |
| <text></text> | The text tag specifies the text to be used for this object. If the text is not found for an object the default text for the object as defined in the template is used. This tag is ignored for images and rich text boxes. This tag is ignored if found outside of <object></object> or <objectdefault> </objectdefault> tags. |
| <link></link> | The link tag specifies to where an object links (web or command). If the link is not found for an object the default link for the object as defined in the template is used. This tag is ignored if found outside of <object></object> or <objectdefault> </objectdefault> tags. |

FIG. 12A

| | |
|---|---|
| `<tooltip></tooltip>` | The tooltip flag specifies the tool tip for this object. If the tool tip is not found for an object the default tooltip for the object as defined in the template is used. This tag is ignored if found outside of `<object></object>` or `<objectdefault></objectdefault>` tags. |
| `<record ></record>` | The record flag contains data for binding to all objects in that record. This data is placed in the page(s) that have contain the objects. Duplicate object names within the record are ignored and the first object with that name is used. However there may be several records containing the same object names. In such a case the objects are placed in the array elements on the Template in first in, first out order. Provided there are more records than array elements the page(s) contain more page(s) will be added. The data starts with lowest object index on the Template for the first record. With each new record the array index is incremented. The only valid tags within the record tag are the object and name tags. Records may be outside of groups however the entire template file will be treated as a group in that case. |
| `<recordset></recordset>` | Groups of records can be bundled together to reflect the group they belong to. The only valid tags within the recordset tag are the recordset tag, record tag and the name tag. |
| `<mxid></mxid>` | This is the guide for the File Template to work off of. |

FIG. 12B

```
<mxid>{1927478da23e}</mxid>
<object>
        <name>lblOnSomePage</name>
        <text>Named example </text>
        <link>http://www.MercialXpress.com/home3.htm</link>
        <tooltip>How cool</tooltip>
</object>

<recordset>
        <record>
                <object>
                        <name>lblTitle</name>
                        <text>hello world!</text>
                        <link>http://www.MercialXpress.com/home3.htm</link>
                </object>
                <object>
                        <image>
                                <name>Logo.jpg</name>
                                <imgdata>1ACE45D679</imgdata>
                        </image>
                        <tooltip>my cool tool tip for this logo</tooltip>
                        <link>mx://page2 </link>
                        <name>imgGraphic1</name>
                </object>
        </record>
        <record>
                <object>
                        <tooltip></tooltip>
                        <text>goodbye world!</text>
                        <name>lblTitle</name>
                        <link>http://www.microsoft.com</link>
                </object>
        </record>
</recordset>
```

FIG. 12C

RICH MEDIA FILE FORMAT AND DELIVERY METHODS

RELATED APPLICATION DATA

This application is a division of U.S. patent application Ser. No. 09/772,541, filed Jan. 29, 2001, which claims priority from U.S. Provisional Patent Application Ser. No. 60/178,482, titled "NETWORK SEARCHING WITH SCREEN SNAPSHOT SEARCH RESULTS," filed Jan. 27, 2000, U.S. Provisional Patent Application Ser. No. 60/199,781, titled "NETWORK SEARCHING WITH SCREEN SNAPSHOT SEARCH RESULTS AND RICH MEDIA FILES WITH SELF-CONTAINED VIEWER," filed Apr. 26, 2000, and U.S. Provisional Patent Application Ser. No. 60/230,043, titled "IMAGE COMPRESSION TECHNIQUE FOR USE WITH ANIMATED IMAGE FILES," filed Sep. 1, 2000. This application is related to U.S. patent application Ser. No. 09/771,360, filed Jan. 26, 2001, now U.S. Pat. No. 6,909,804, titled "IMAGE COMPRESSION USABLE WITH ANIMATED IMAGES," which is commonly assigned.

FIELD OF THE INVENTION

This invention pertains to a portable document format, and more particularly to a cross-platform portable document format and delivery method that supports complicated pages.

BACKGROUND OF THE INVENTION

The rise of the internet and the world wide web has made the sharing of information an attainable goal. But compatibility between computers remains a concern. Many computers cannot read each other's files, because of differences in format. When a web site wants to provide information in streaming and portable files to its clients, it has to prepare different versions of the files for each different type of computer that may need to access the files.

Software can help to reduce this problem, in that the data can be left in a platform-independent, proprietary data format. Different viewers are then used to read the document on different computer platforms. But this solution introduces its own problems. To be able to read the document, the user has to install the viewer on his computer system. Without the viewer, the user is unable to read the document. And once installed, the viewer stays resident on the user's system. This means that even when the user is done reading the document, a footprint is left on the user's system: the viewer. Subsequent updates can obsolete the stored view, requiring download of an updated viewer.

In addition, the current viewer technology is dependent on the user requesting the file. Although "push technology" has been around for some time, viewing software is entirely dependent on the user selecting the document for download. Currently, there is no technology that supports that automatic delivery of new documents to the user.

Accordingly, a need remains for a platform-independent viewer that leaves no footprint on the user's system and that can automatically deliver a new document to the user that addresses these and other problems associated with the prior art.

SUMMARY OF THE INVENTION

The invention is a rich media file designed to provide the user with information displayed in a file that, when deleted, leaves no footprint on the user's system. The rich media file includes information, formatted by the client (i.e., the builder of the rich media file) for display. Embedded in the rich media file is a viewer operable on the user's computer system. The rich media file can be deleted in a single step, removing both the information and the viewer, and leaving no footprint on the user's computer system.

The invention further includes a method for retrieving, downloading, and updating a rich media file. A user selects a link on a network. The rich media file is delivered using a unique file identification stored within the link, the unique file identification being other than a file name for the rich media file. The user can then save the rich media file on his computer system, and delete the rich media file at will, leaving no footprint on the user's system.

The invention further includes a method for building a rich media file. A client assembles the information for the rich media file, and formats the information as desired for display. The information is compiled into an intermediate file format, which is then coupled with a viewer and stored as a rich media file. The rich media file is designed as a unitary file, so that by deleting just the rich media file, no footprint remains on a user's computer system.

The invention further includes an intermediate file format used to store the client's collected information before the rich media file is compiled, and a database for storing information about transactions involving rich media files.

The foregoing and other features, objects, and advantages of the invention will become more readily apparent from the following detailed description, which proceeds with reference to the accompanying drawings.

BRIEF DESCRIPTION OF THE DRAWINGS

FIGS. 12A and 12B show tags used in the preferred embodiment of the intermediate file format used to generate the rich media file of FIG. 1.

FIG. 12C shows an example file stored in the intermediate file format using the tags of FIGS. 12A and 12B.

DETAILED DESCRIPTION

Rich Media Files

Figure 1:
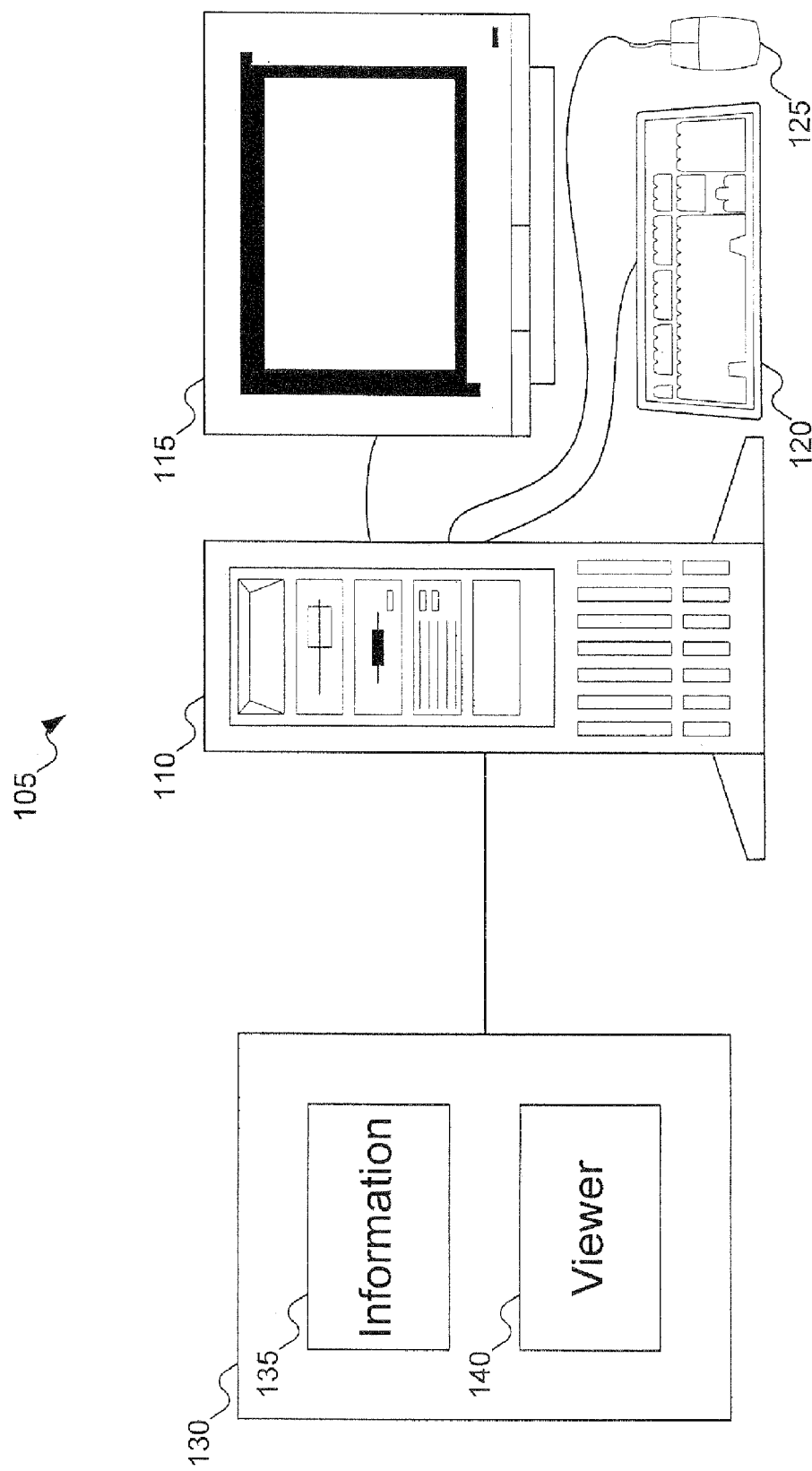
FIG. 1 shows a rich media file stored on a computer system.

FIG. 1 shows a rich media file stored on a computer system. In FIG. 1, computer system 105 includes a computer 110, a monitor 115, a keyboard 120, and a mouse 125. Computer 110 includes hardware components, such as a processor and a memory (not shown). Computer system 105 can also include other equipment not shown in FIG. 1, for example, other input/output equipment or a printer.

Rich media file 130 includes information 135 and viewer 140. Information 135 contains the information the builder of rich media file 130 desires the user to view. More detail about what can constitute information 135 is discussed with reference to FIG. 3 below. Viewer 140 displays information 135 to the user. In one embodiment, viewer 140 is platform-independent and can operate on any computer platform. In a second embodiment, viewer 140 is included with rich media file 130 depending on the particular type of computer platform on which information 135 is to be displayed. In this second embodiment, a different format of rich media file is provided for each type of computer platform. Thus, there can be one rich media file for a Microsoft® Windows® operating system, another rich media file for a Palm OS® handheld, a third for a Linux® operating system, and so on. (Microsoft and Windows are either registered trademarks or trademarks of Microsoft Corporation in the United States and/or other countries. Palm OS is a trademark, of Palm, Inc. or its subsidiaries. Linux is a registered trademark of Linus Torvalds.)

In the preferred embodiment, although rich media file 130 includes both information 135 and viewer 140, information 135 and viewer 140 are stored separately and assembled (using the appropriate viewer for the user's computer platform) just before delivery to the user. This allows for rich media file 130 to be extensible. For example, as new features are added to rich media file 130, the new features become available to users receiving rich media file 130, even if information 135 was stored before the new features were available. Or additional objects or functions can be added to rich media file 130, all without affecting the end user. However, a person skilled in the art will recognize that a variety of rich media files can be pre-assembled for each type of computer platform and stored in anticipation of need.

Figure 2:
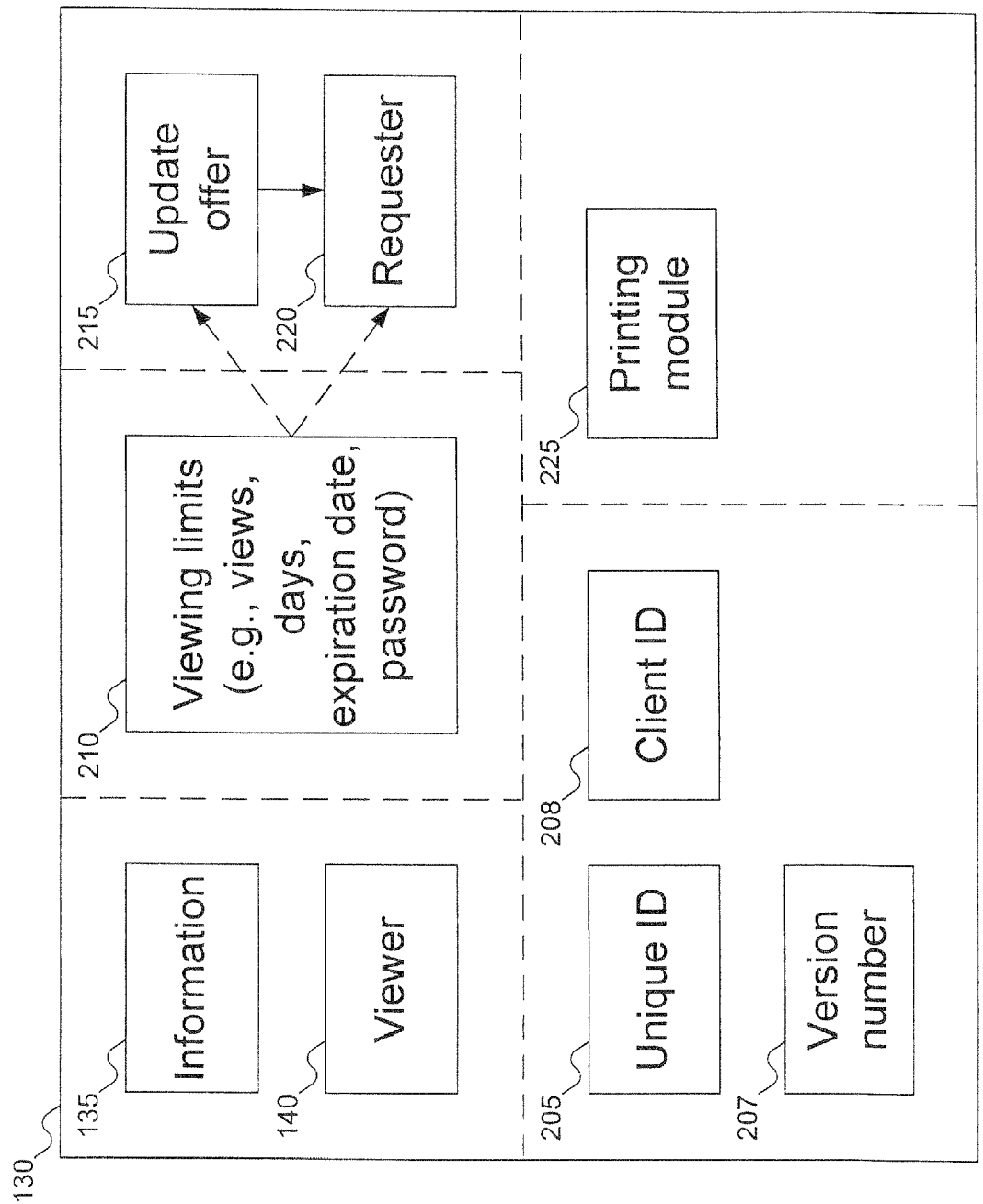
FIG. 2 shows other elements of the rich media file of FIG. 1.

FIG. 2 shows other elements of the rich media file of FIG. 1. In FIG. 1, only information 135 and viewer 140 were displayed. These are the minimal elements included with rich media file 130. FIG. 2 shows other, optional, elements that can be included with rich media file 130. Unique ID 205 is a unique ID used to internally identify the rich media file. Because different rich media files prepared by different clients might have the same name, unique ID 205 is used to distinguish among rich media files of any same file name. In addition, a single client might choose to create different rich media files with the same name (discounting here for the possibility of different versions of the same rich media file). Unique ID 205 can also be used to distinguish between different rich media files by the same client.

In the preferred embodiment of the invention, version number 207 is also included to distinguish among different versions of rich media file 130. The combination of unique ID 205 and version number 207 is unique across all versions of all rich media files. This allows for storage and identification of past versions of rich media file 130 without changing unique ID 205 for each version of rich media file 130. However, a person skilled in the art will recognize that the combination of unique ID 205 and version number 207 can be replaced with a single, unique identifier.

Client ID 208 is a unique identifier that identifies the client that built a specific rich media file 130. Client ID 208 allows for searching of all rich media files assembled by the client, but a person skilled in the art will recognize that client ID 208 can be eliminated without losing any functionality in rich media file 130. Unlike the remaining elements of rich media file 130, unique ID 205, version number 207, and client ID 208 are normally added automatically when rich media file 130 is built: the client does not have to specify them.

Viewing limits 210 specify access and function controls for rich media file 130. There are several different types of viewing limits that can be used, and a person skilled in the art will be able to recognize other alternatives. The normal types of viewing limits 210 include automatic expiration mechanisms and passwords. Expiration mechanisms are designed to cause rich media file 130 to expire after certain conditions are met. The user is presented with a dialog box, informing him that rich media file 130 is expired. The user can then be allowed to continue using rich media file 130, disallowed from using rich media file 130, or offered the option to try another rich media file. Typical expiration conditions include allowing the user to view rich media file 130 a certain number of times, or over a certain number of days, or until a particular, predetermined date is reached. Passwords require the user to enter the correct password set by the designer of rich media file 130 before rich media file 130 can open. If the wrong password is entered, rich media file 130 does not open for the user.

Where rich media file 130 can expire upon reaching a viewing limit, the client can provide the user the option of attempting to locate a newer version of rich media file 130. Update offer 215 prompts the user, asking whether rich media file 130 should check for a newer version of the same rich media file. If the user so specifies, this is accomplished by querying the server on which rich media file 130 was originally stored and providing unique ID 205 and version number 207. If a newer version of rich media file 130 exists (or if a specified file in a series of files is listed for such a situation), then requester 220 can request the newest version of the file from the server. The file can be delivered by download, e-mail, and other retrieval mechanisms.

Even if no viewing limits are imposed, rich media file 130 can check for an update of itself anyway. Update offer 215 and requester 220, although they inter-operate with viewing limits 210, can operate separately.

Finally, rich media file 130 is designed to be modular. This means that the builder can specify certain features to be included with rich media file 130, and exclude others. An example of this is the ability to print rich media file 130 using printing module 225. If the client does not want to allow the user to print rich media file 130, the client can exclude printing module 225. If the client chooses to exclude modules like printing module 225, rather than just disabling the code for these modules, the code for these modules is excluded from rich media file 130. This helps keep rich media file 130 at its smallest size. Other modules that the client can choose to include or exclude are zooming (looking closely at one part of rich media file 130, typically in an image), the ability to easily forward a copy of rich media file 130 to a friend (by simply providing the friend's e-mail address, the friend can receive rich media file 130), and a status bar.

In addition, viewing limits 210 discussed above are another module that can be included or excluded. If the client includes a viewing limit, such as a password for rich media file 130, viewing limits 210 are included with rich media file. If no viewing limit is specified, viewing limits 210 are excluded from rich media file 130, thereby reducing the size of rich media file 130.

Figure 3:
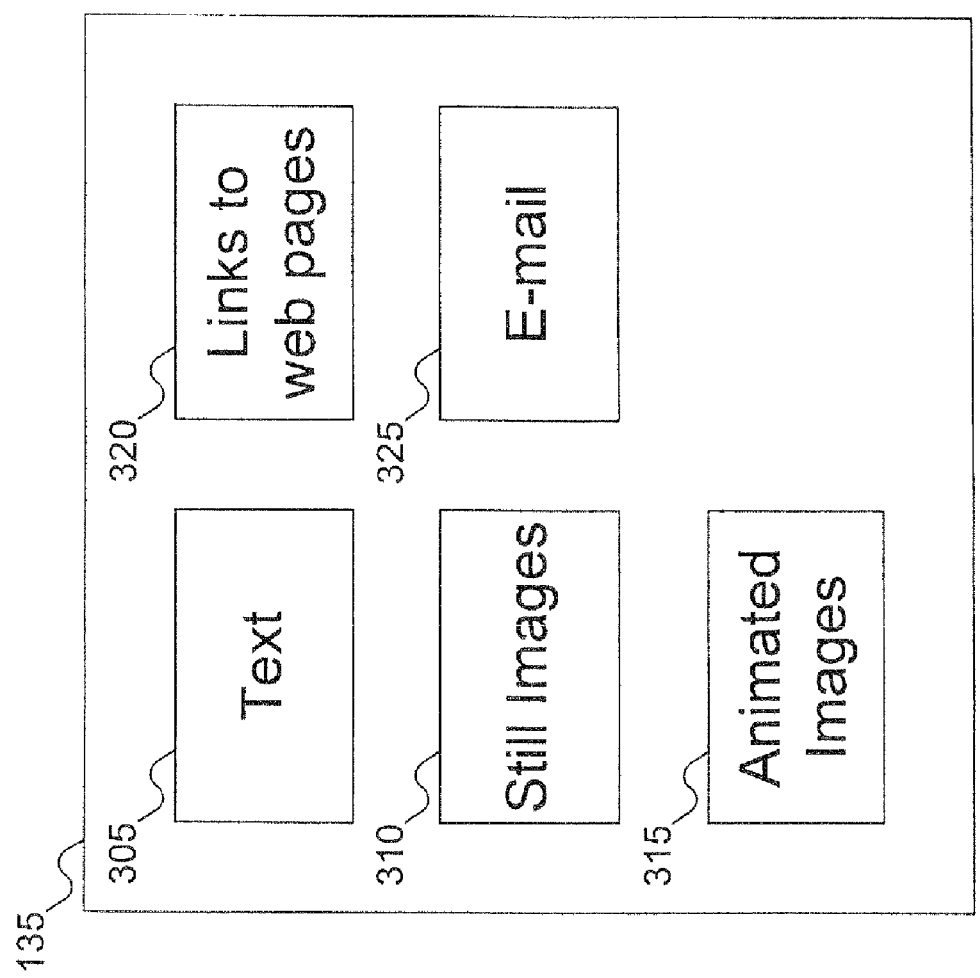
FIG. 3 shows elements of the information included in the rich media file of FIG. 1.

FIG. 3 shows elements of information 135 included in the rich media file of FIG. 1. Information 135 can include text 305, still images 310, animated images 315, and links to web pages 320 accessible over the network but whose content is not directly included with the rich media file. Text 305, still images 310, and animated images 315, audio, video, animated objects, and other content can be generated specifically for information 135, or they can be drawn from available sources and assembled into information 135 for use in the rich media file.

Information 135 can also include e-mail link 325. E-mail link 325, when activated, opens a form for sending an e-mail message using the user's preferred e-mail handler. In the preferred embodiment, e-mail link 325 can, if so designated by the client, automatically fill in the destination for the e-mail, since usually the user will select e-mail link 325 to send an e-mail to the builder of the rich media file. But a person skilled in the art will recognize that the form opened by e-mail link 325 can be completely blank, and can be independent of any e-mail handler used by the user.

Figure 4:
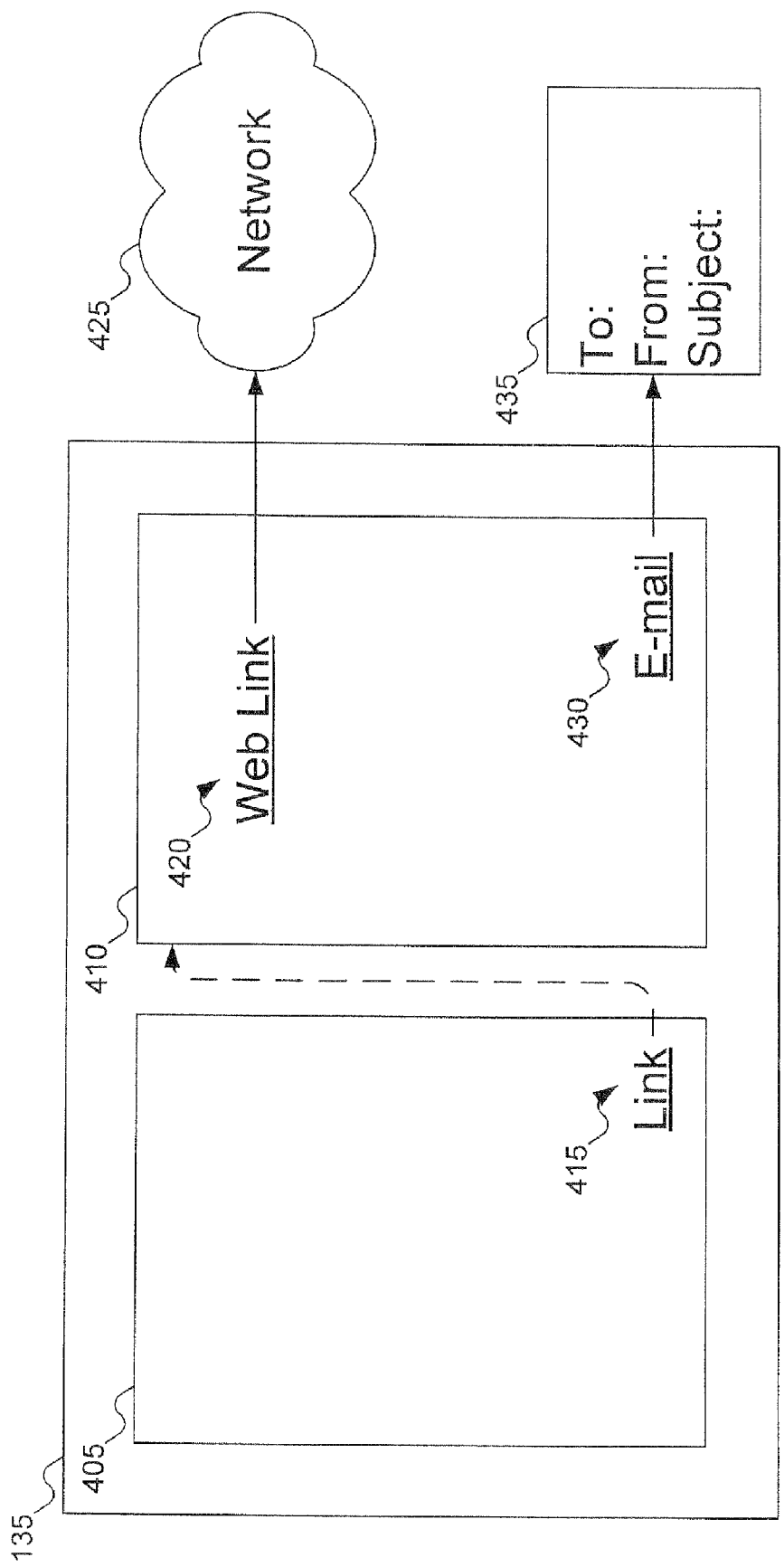
FIG. 4 shows the rich media file of FIG. 1 having two pages, links to pages on a network, and e-mail capability.

FIG. 4 shows the rich media file of FIG. 1 having two pages, links to pages on a network, and e-mail capability. Information 135 has been formatted to separate the material into two pages 405 and 410. One or more pages can be displayed, as desired by the client. When the user has finished viewing page 405, the user can select link 415 to traverse to page 410 and view that page. (Although not shown in FIG. 4, there is usually a complementary link that will take the user back to page 405 or any other internal page, either directly or indirectly.)

In page 410, the builder has specified web link 420. Web link 420, when selected by the user, opens the user's preferred network browser program and takes the user to the specified Universal Resource Locator (URL) over network 425. This opens a particular page on the network for display to the user.

Page 410 also includes e-mail link 430. As discussed above with reference to FIG. 3, e-mail link 430, when selected, opens e-mail form 435, which the user can then complete with his desired text. The e-mail can then be sent in the regular way to its destination, without the user having to remember and manually type the destination address for the e-mail in his e-mail handler.

Figure 5A:
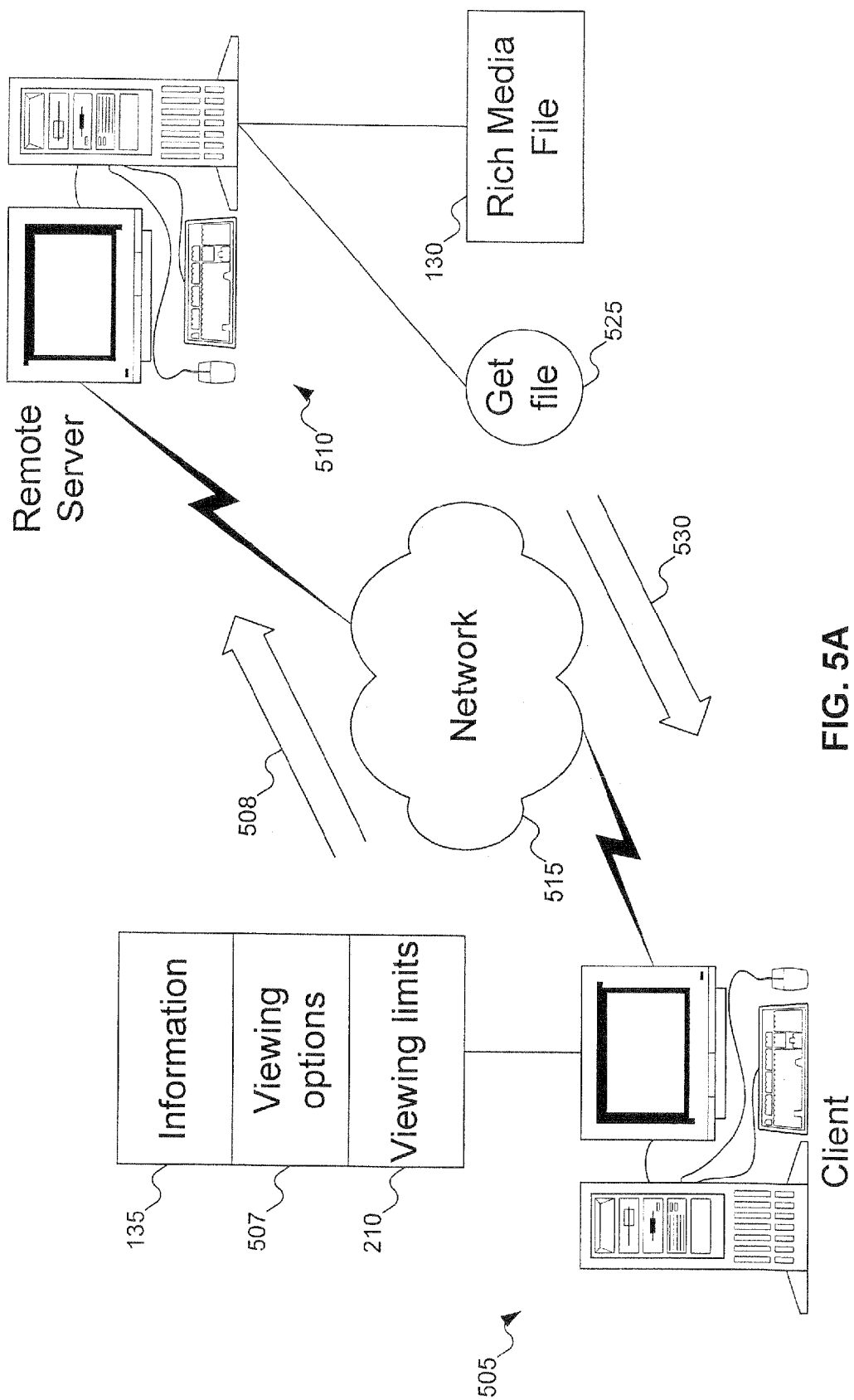
FIGS. 5A and 5B show the method of a client making the rich media file of FIG. 1 available to a user.
Figure 5B:
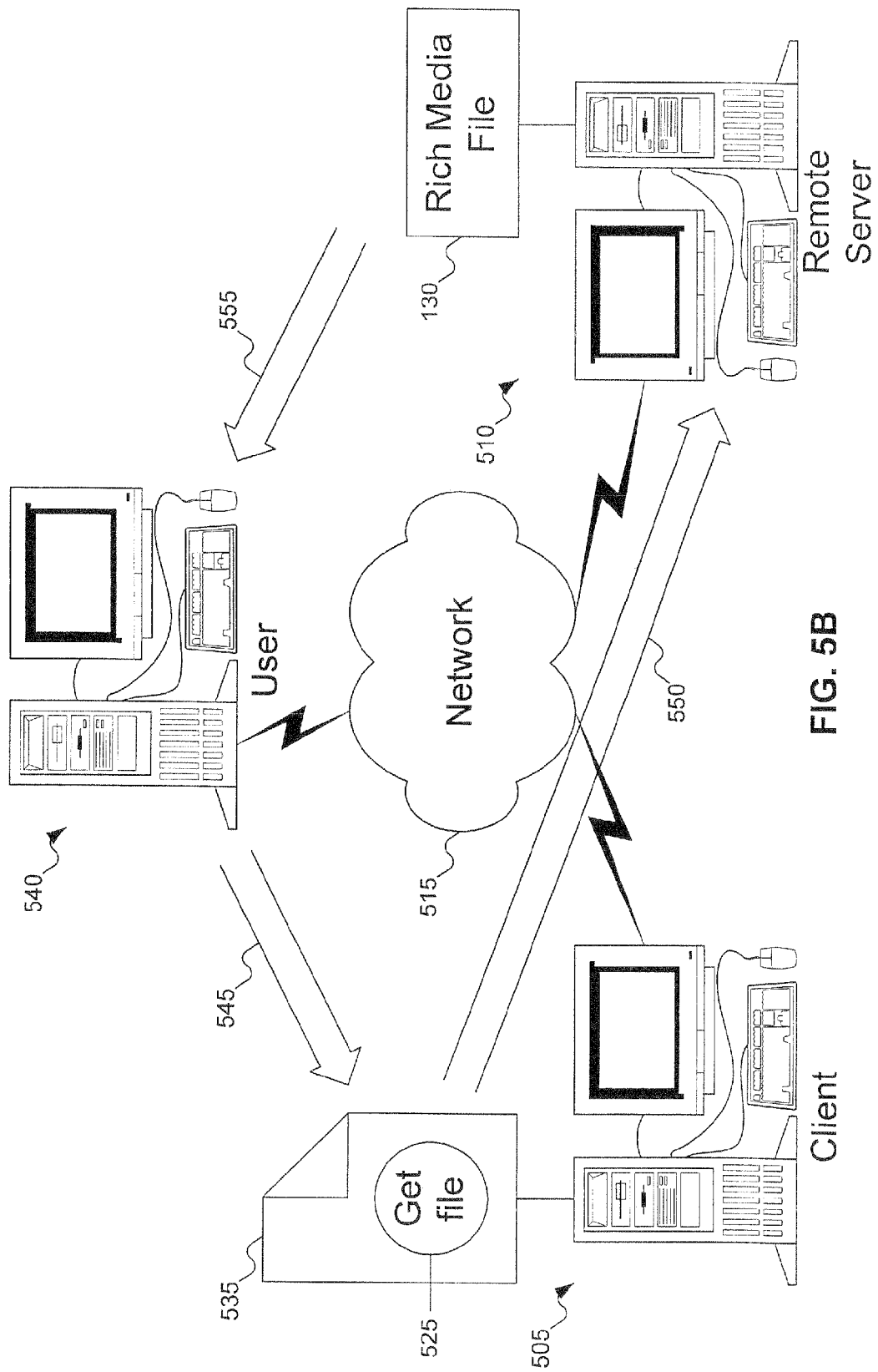

FIGS. 5A and 5B show a client making the rich media file of FIG. 1 (or FIG. 2 or 3) available to a user. In FIG. 5A, the client (using his computer 505) has prepared and collected information 135, viewing options 507 (such as whether to include the printing module), and viewing limits 210. Then, as shown by arrow 508, information 135, viewing options 507, and viewing limits 210 (along with anything else the client desires to specify) are placed in an intermediate file format and sent to remote server 510, where rich media file 130 is to be assembled and stored, over network 515. Once received, remote server 510 assembles the data provided by client 505, adds the appropriate pieces (such as the viewer) and completes the assembly of rich media file 130. Rich media file 130 is then stored on remote server 510. Remote server 510 also prepares link 525, which is returned to client 505 (as shown by arrow 530). Client 505 can then place link 525 on its web page, allowing customers to retrieve rich media file 130, as described next in FIG. 5B.

In FIG. 5B, client 505 has added link 525 to web page 535, which is maintained by or on behalf of client 505. When user 540 visits web page 535, he sees link 525 and can select it. If the user selects link 525 (shown by arrow 545), the request for rich media file 130 is redirected from web page 535 to remote server 510 where rich media file 130 is stored (as shown by arrow 550). Remote server 510 then sends or displays rich media file 130 to user 540, by download, e-mail, streaming file, or other means (as shown by arrow 555).

The above description for the storage of rich media file 130 on remote server 510 is the preferred embodiment. This simplifies maintenance of the rich media file, as the client does not have to store and track the different versions of rich media file 130. However, a person skilled in the art will recognize that rich media file 130 can be returned to client 505 instead of link 525, and client 505 can be responsible for maintaining rich media file 130. Similarly, although rich media file 130 is described as being built on remote server 510, a person skilled in the art will recognize that, with the appropriate software installed, client 505 can convert the data into rich media file 130 itself. But this approach can leave client 505 building rich media file 130 with a viewer lacking streaming ability or new features, if the build software is eventually updated.

It is important to note that, in the preferred embodiment described in FIGS. 5A and 5B, there are two distinct files being created. The first file is the intermediate file format (sometimes called the "project file") created by the client. This intermediate file format stores the information the client wishes to include in rich media file 130. The intermediate file format is platform-independent, meaning it can be created on any computer system. But in and of itself, the intermediate file format is not viewable by the user: until the viewer is coupled to the information, the information is not viewable. It is only after the viewer is coupled to the intermediate file format that rich media file 130 takes shape.

Figure 6:
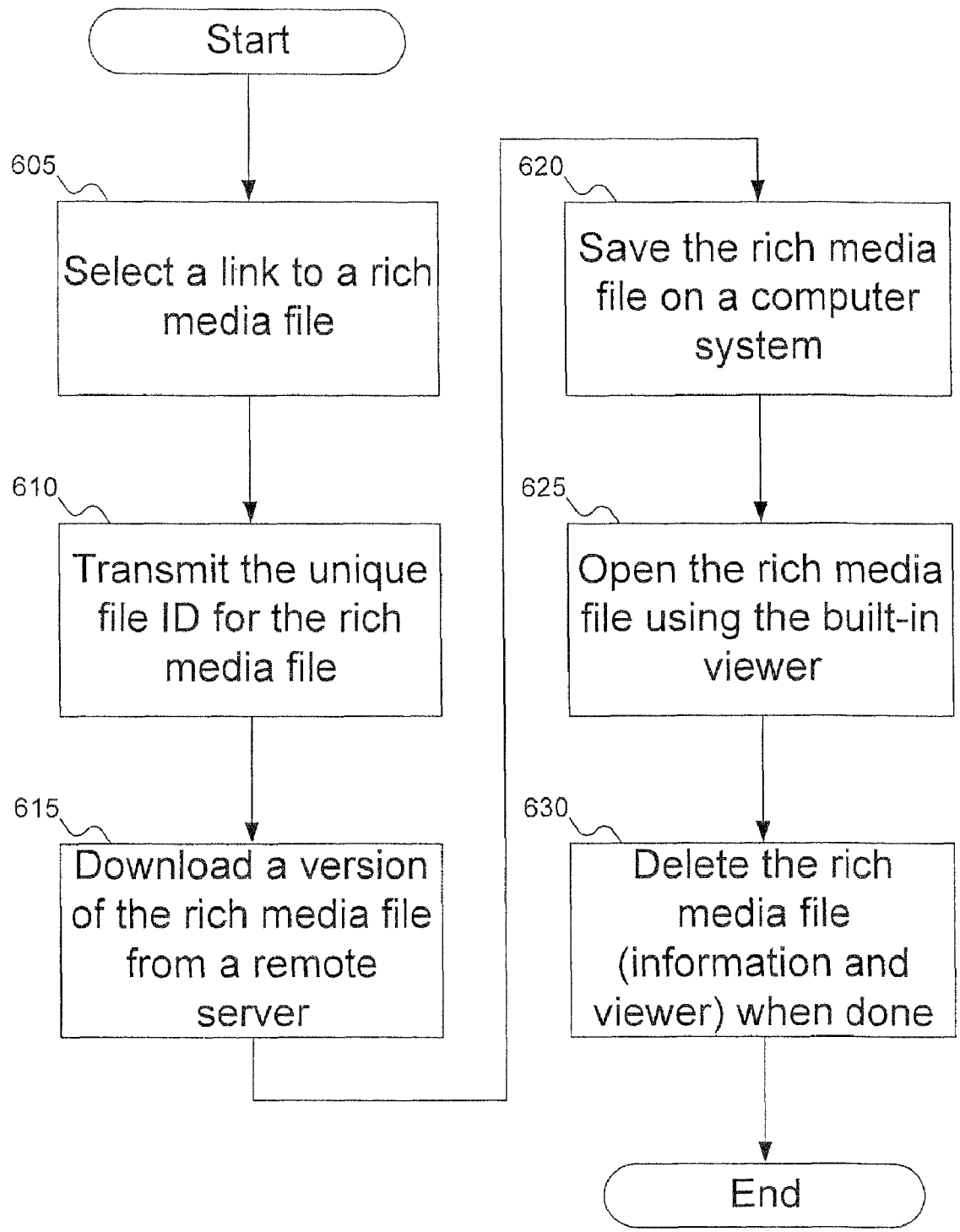
FIG. 6 flowcharts the procedure used to retrieve the rich media file of FIG. 1, as shown graphically in FIG. 5B.

FIG. 6 shows the procedure used to retrieve the rich media file of FIG. 1, as shown graphically in FIG. 5B. At step 605, the user selects a link to the rich media file. At step 610, the unique file ID for the rich media file is transmitted. Note that, as described in FIG. 5B, the rich media file is typically stored on a remote server different than the one on which the client's web site (where the user found the link) is stored, and so the unique file ID (which is assigned to the client in the build software) is forwarded from the client's site to the appropriate remote server. However, the rich media file can be stored on the client's server as well, in which case the redirecting of the unique file ID is avoided. Returning to FIG. 6, at step 615, the rich media file is downloaded from the remote server. At step 620, the user saves the rich media file on his computer system or views a streaming version of the rich media file. At step 625, the user opens the rich media file, using built-in viewer 140. Finally, at step 630, the user deletes the rich media file (both the information and the viewer) when he is finished with the rich media file. Because the information and viewer are contained in a single, unitary file, by deleting the rich media file, no footprint is left on the user's computer system. A person skilled in the art will recognize that step 630 can be separated by a significant distance in time from the other steps, as the user might choose to keep the rich media file on his computer system for days, weeks, or longer, subject only to any viewing limits placed on the rich media file by the client.

At step 615, the term "download" was used to describe the procedure for retrieving the rich media file. Although the rich media file can be downloaded over the network from the remote server, a person skilled in the art will recognize that there are other methods for delivering the rich media file to the user. For example, the rich media file can be attached to an e-mail message and delivered by electronic mail to the user (assuming the user's e-mail address is known). E-mail delivery of streaming rich media files to users is the preferred form of delivery. In another variation, the rich media file can be streamed from the remote server, rather than being completely delivered to the user.

Figure 7:
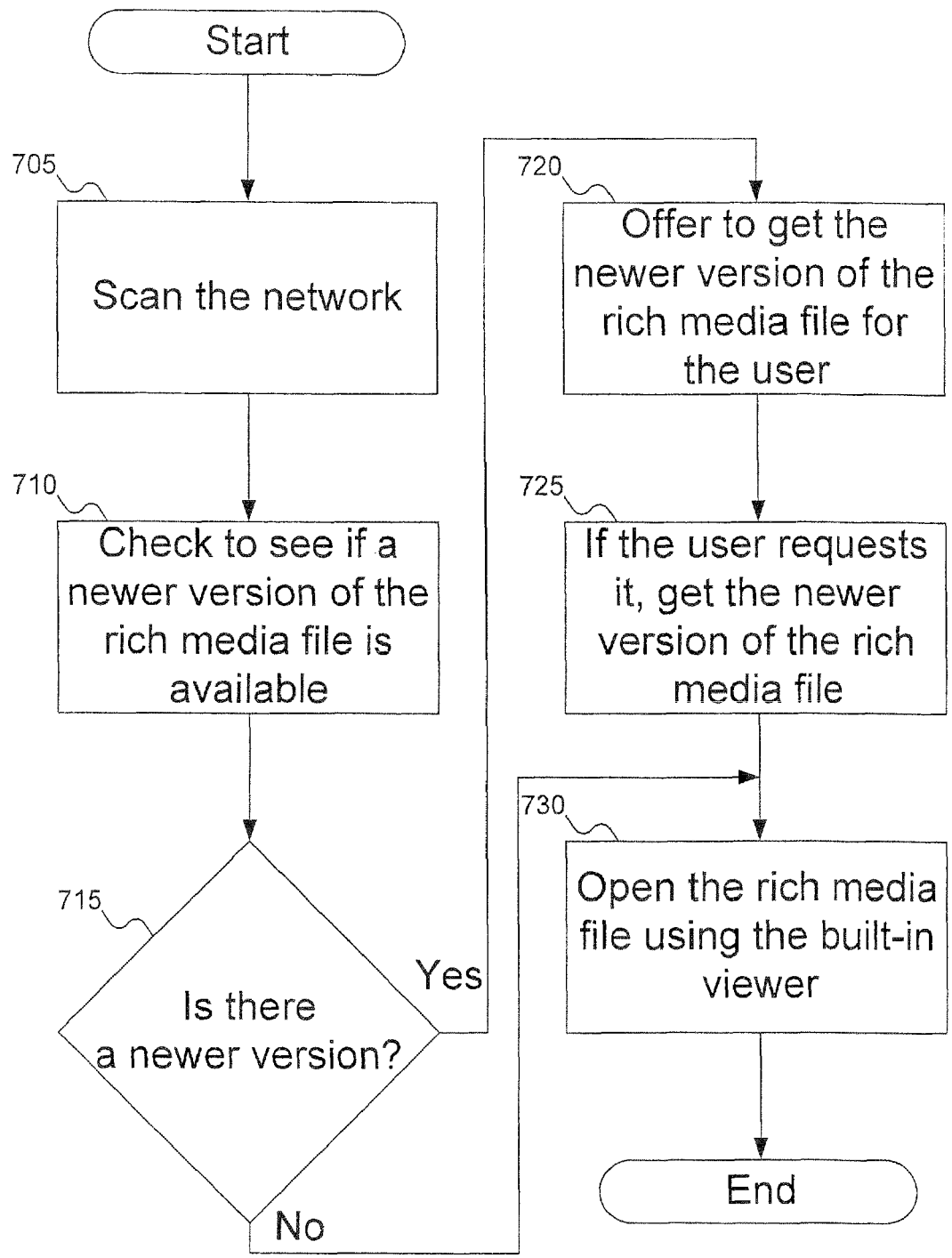
FIG. 7 flowcharts the procedure used to update the rich media file of FIG. 1 to a newer version.

FIG. 7 shows the procedure used to update the rich media file of FIG. 1 to a newer version. At step 705, the rich media file scans the network. Since the rich media file knows the server on which it was stored (in the preferred embodiment, all rich media files are stored on the same remote server, but a person skilled in the art will recognize that rich media files can be stored on a number of different remote servers), it is easy to scan the network for the appropriate remote server. At step 710, the rich media file checks to see if there is a newer version of the rich media file available. At step 715, the rich media file decides what to do. If there is a newer version of the rich media file, then at step 720 the rich media file offers to retrieve the newer version for the user. At step 725, if the user requests the newer version of the rich media file, the newer version is retrieved from the remote server, and is used to replace the older version of the rich media file. At step 730, whether or not the user wanted the newer version of the rich media file, and whether or not a newer version of the rich media file was available, the version of the rich media file stored on the user's computer system is opened for viewing.

FIG. 7 is described in terms of updating the rich media file of FIG. 1. A person skilled in the art will recognize that FIG. 7 is applicable at any time. Nevertheless, in the preferred embodiment, the flowchart of FIG. 7 is used when the rich media file has expired. Until the rich media file has expired, in the preferred embodiment the user can continue to use the rich media file.

In addition to updating an expired file, the client can design the rich media file to "update" to a different file. For example, the client might desire that, after the rich media expires, the user be offered the choice of a different rich media file. Thus, the rich media files can "chain," instead of updating to the latest version of the downloaded rich media file.

It can also happen that there is no update to the rich media file currently available. Although the user is no longer permitted to view the rich media file, if there is no later version, the user has nothing else to view. The user can then place his name on an update list, so that when the latest version of the rich media file becomes available, it will automatically be provided to the user.

Figure 8:
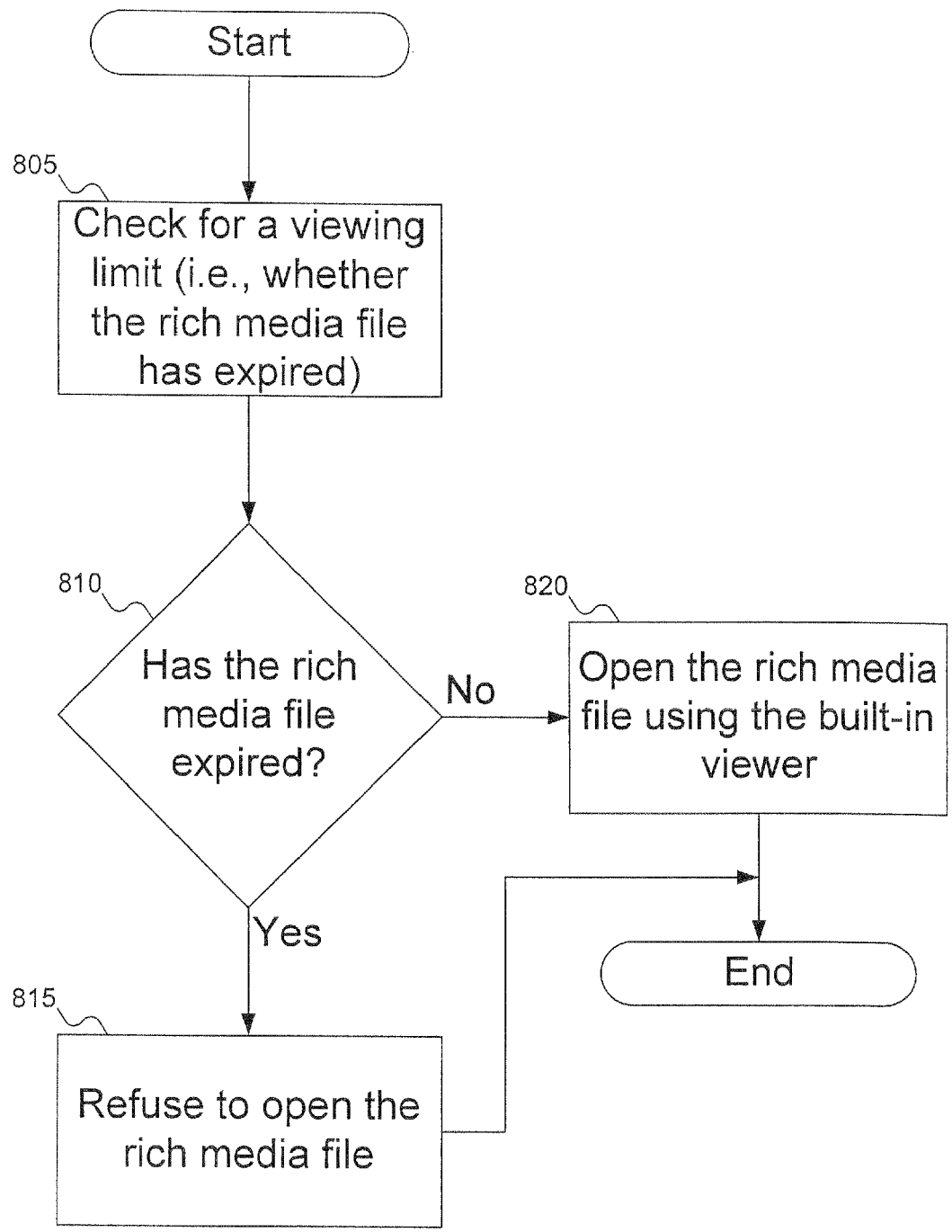
FIG. 8 flowcharts the procedure used to expire the rich media file of FIG. 1.

FIG. 8 shows the procedure used to expire the rich media file of FIG. 1. At step 805, the rich media file checks to see if there is a viewing limit built into the file that can cause the rich media file to expire. Such a viewing limit, as described above, can include a maximum number of views for the rich media file, a maximum number of days on which the rich media file can be opened, or an expiration date. If there is a viewing limit, then at step 810 the rich media file checks to see if the conditions associated with the viewing limit have been satisfied (i.e., the rich media file has been opened too many times, or on too many days, or past the expiration date). If the rich media file has expired, then at step 815 the rich media file does not open. Otherwise, at step 820, the rich media file streams or opens for viewing.

Figure 9A:
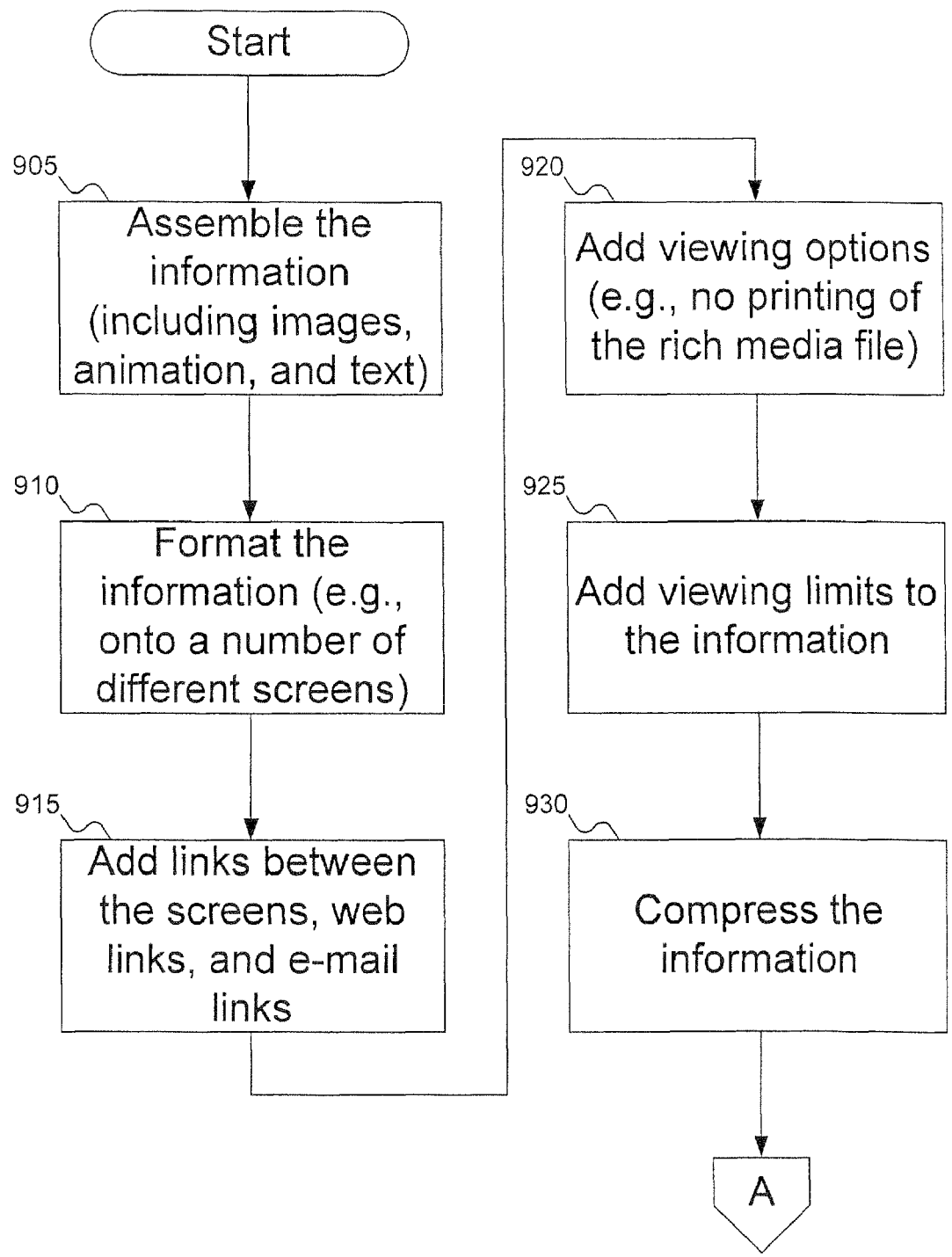
FIGS. 9A and 9B flowchart the procedure used to build the rich media file of FIG. 1.
Figure 9B:
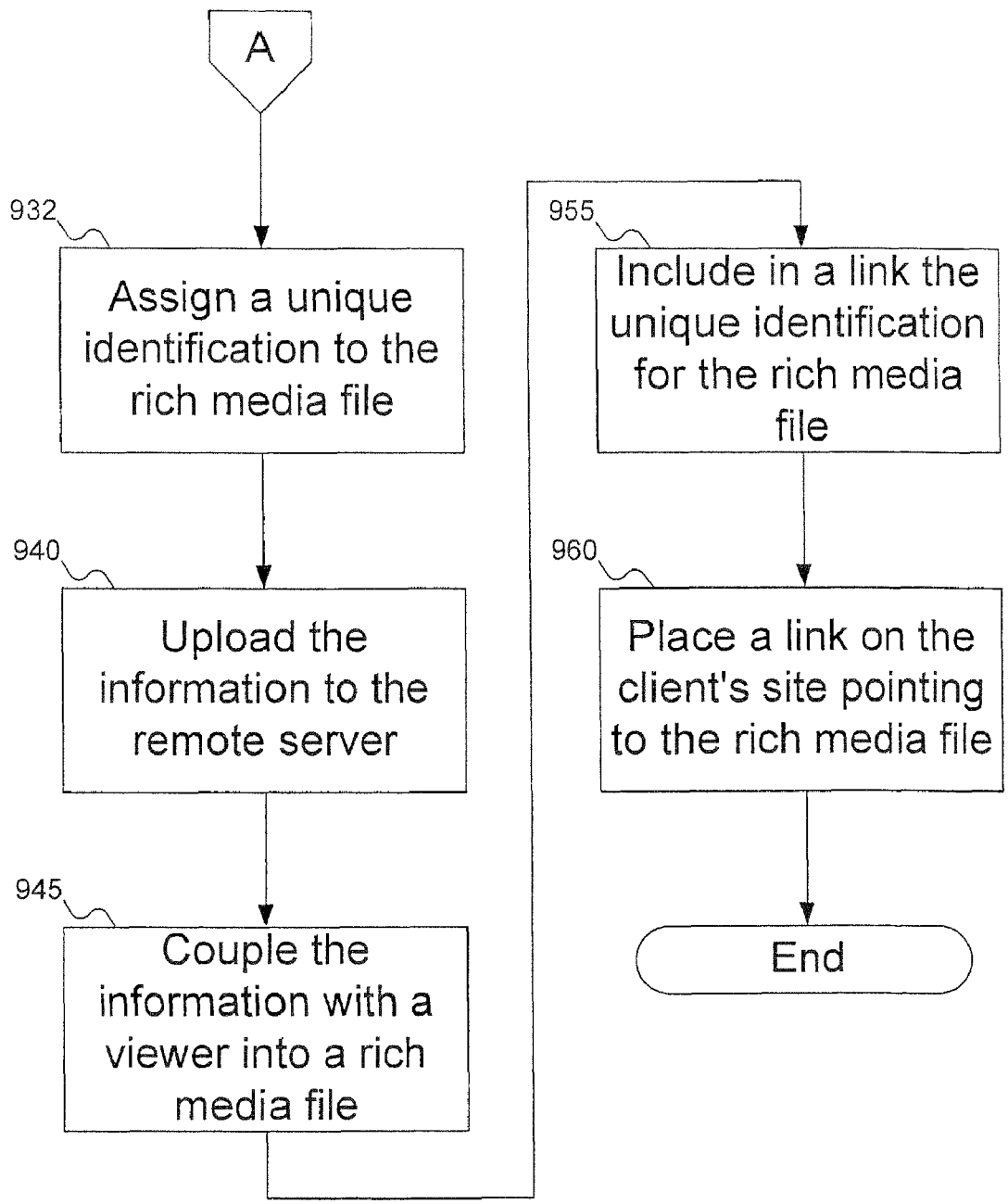

FIGS. 9A and 9B show the procedure used to build the rich media file of FIG. 1. At step 905, the client assembles the desired information to include in the rich media file. As described above, this information can include text, still or animated images, audio, video, animated objects, web links, e-mail forms, or other content. At step 910, the client formats the information as desired (e.g., the information can be divided across several pages). At step 915, the client adds links so that the multiple pages can be navigated. At step 920, the client specifies any viewing options (e.g., that the rich media file is not to be printable). At step 925, the client adds any viewing limits to the information (e.g., password protection for the rich media file, or expiration parameters). At step 930, the information is compressed. In the preferred embodiment, the information is compressed using the compression algorithm described in co-pending U.S. patent application Ser. No. 09/771,360, titled "IMAGE COMPRESSION USABLE WITH ANIMATED IMAGES," filed Jan. 26, 2001, now U.S. Pat. No. 6,909,804, but a person skilled in the art will recognize that other compression algorithm(s) can be used.

At step 932, a unique file ID is assigned to the intermediate file format upon the first save in the design tool. The version number and the client ID are also assigned to the intermediate file format, each time the client makes changes to the intermediate file format. At step 940, the information is uploaded to the remote server, where the information will be compiled into a rich media file. (In the preferred embodiment, the remote server will not compile the information into a rich media file and add a viewer unless the client ID attached to the intermediate file format matches a valid client ID stored in the database on the remote server. See FIG. 11 below for more information about the database.) At step 945, the information is coupled with a viewer to form rich media file 130. At step 955, a link is defined to include the unique file ID of the rich media file, so that the correct rich media file can be retrieved from the remote server when requested and sent to the client. At step 960, the client places the link to the rich media file on his site. Step 955 is preferably done automatically by the remote server when the link is provided, so that the client does not have to know the unique file ID of the rich media file. Since the server controls versioning of the intermediate file formats, when a newer version of a intermediate file format is sent to the remote server to be built, the link to the original file need not be changed and the remote server will deliver the most recent version when requested by a user.

In the preferred embodiment, steps 905-932 of FIGS. 9A and 9B are implemented using a special tool designed to allow the client to assemble the information into the intermediate file format. However, a person skilled in the art will recognize that this special tool is not necessary. For example, in a variation of the description above, the client can use his favorite design tool to design the information for display in the rich media file. Then, when the client is ready to save the information in the platform-independent intermediate file format, the client "prints" the information to the intermediate file format. To accomplish this, a special printer driver is provided. The printer driver captures the layout and contents of the information and automatically stores it in the intermediate file format, without requiring the client to use the special build tool. However, adding links, assigning viewing options, and using other special features of the rich media file requires the special build tool.

Figure 10:
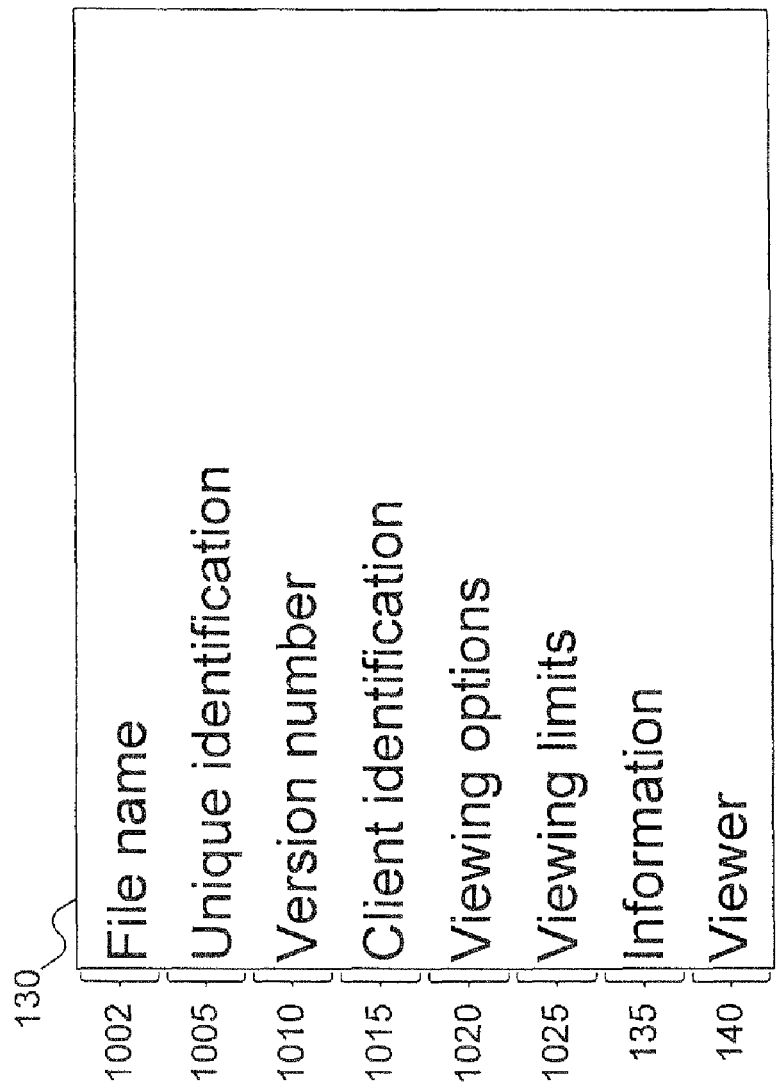
FIG. 10 shows a structure for a rich media file according to the preferred embodiment of the invention.

FIG. 10 shows a structure for a rich media file according to the preferred embodiment of the invention. Rich media file 130 includes unique identification 1005 that uniquely identifies the rich media file, even from other rich media files with the same file name 1002. Version number 1010 distinguishes between the different versions of rich media file 130, so that multiple versions of the same rich media file can be stored and retrieved. Client identification 1015 uniquely identifies the client who built rich media file 130, in case it is necessary to track rich media file 130 back to its builder, as well as for tracking and reporting of the rich media file. Viewing options 1020 identify the specific modules to be included with rich media file 130. For example, if the client has specified that rich media file 130 is not to be printable, then the printing module is not included with viewing options. Because viewing options 1020 are modular, the client can specify exactly which options are to be included and which are to be excluded. Viewing limits 1025 specify the limitations on viewing rich media file 130: for example, rich media file 130 can be password protected, or can include an expiration option. Finally, information 135 and viewer 140 have already been discussed.

Figure 11:
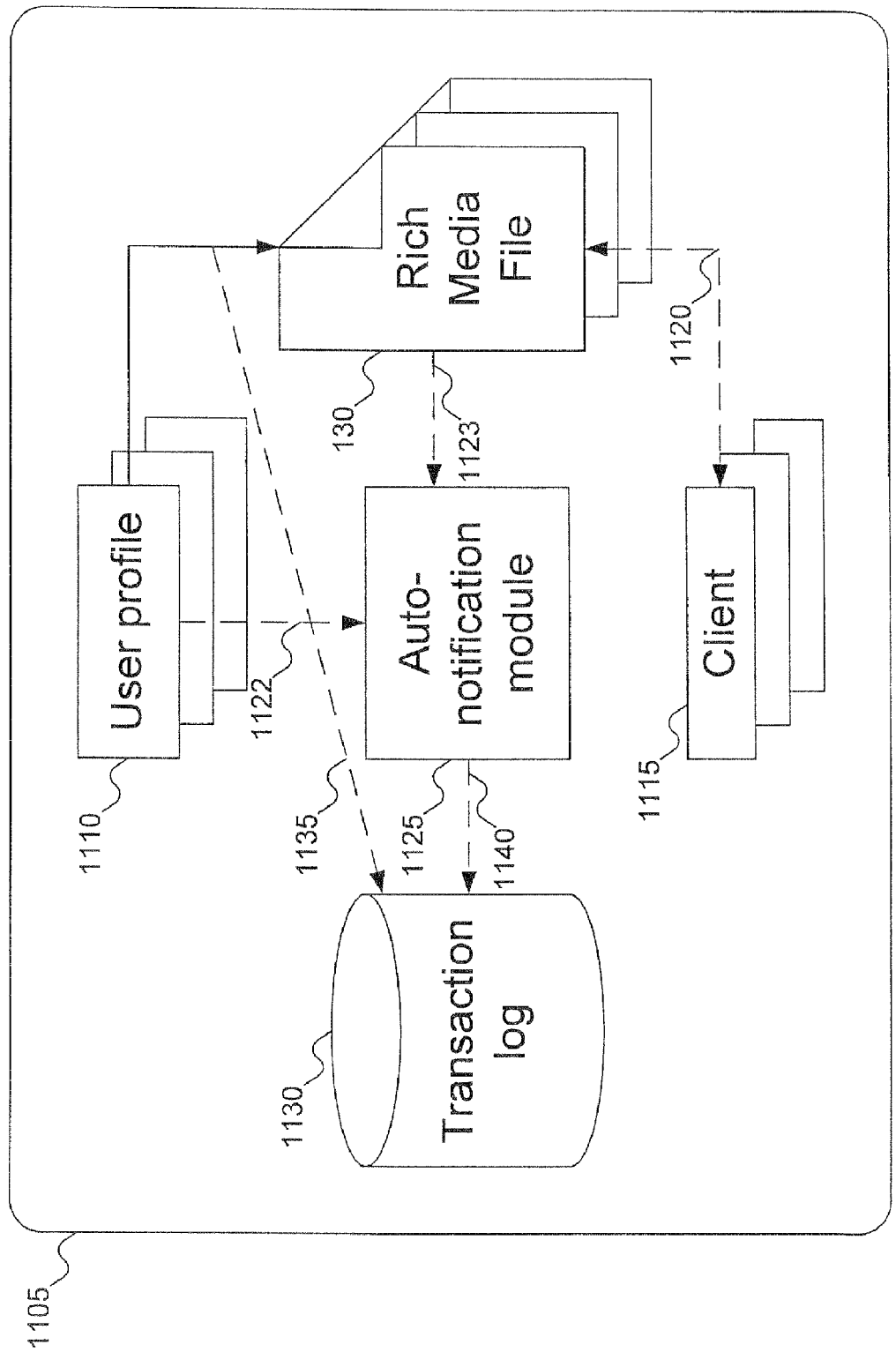
FIG. 11 shows a structure for a database for managing rich media files according to the preferred embodiment of the invention.

FIG. 11 shows a structure for a database for managing rich media files according to the preferred embodiment of the invention. In FIG. 11, database 1105 manages the rich media files. Aside from one or more rich media files 130, database 1105 stores user profiles 1110. Each user profile stores information about a single user, such as name, e-mail, and demographic information. Other information can also be captured and stored in user profiles 1110, as desired. Client information 1115 stores information about the clients who built rich media files 130, such as name, location, point-of-contact, billing address, and so forth. Database 1105 can also store links between rich media files 130 and client information 1115, such as link 1120. These links help in searching for the client responsible for a particular rich media file, or for all rich media files built by or for a single client.

Auto-notification module 1125 allows for auto-notification of updated rich media files to users. If user profile 1110 indicates that a user wants to automatically be sent an updated rich media file when one is available, auto-notification module 120 stores this information (shown by dashed arrow 1122). Then, when the appropriate rich media file is updated (shown by dashed arrow 1123), auto-notification module automatically sends the latest version of the rich media file to the user.

Transaction log 1130 stores information about every transaction occurring in database 1105. For example, transaction log 1130 stores information about each rich media file retrieved, by which user, and so on. Thus, when one of the users requests a rich media file, this transaction is logged, as shown by dashed line 1135. Or, when auto-notification module 1125 sends out a new version of a rich media file to a user, this transaction is logged, as shown by dashed line 1140. Or when a client provides information to allow the assembly of a new rich media file, this transaction is logged. A person skilled in the art will also recognize other transactions in the database that can be logged.

There are many variations on the concept of the rich media file. Aside from the ability to provide users with pre-prepared data files with a built-in viewer, the data formatted as desired by the client, rich media files can be prepared by using something akin to a "mail merge" technique. To accomplish this, a template is prepared for the rich media file. The actual content (or parts of it) are not directly included, but only tagged by assigning names to the text image and other objects that will contain the merged data. Information can then be drawn from a database using the tags to place the information in the corresponding object in the rich media file. When the rich media file is to be assembled, the merged information is collected, and the rich media file is assembled as described above.

In the preferred embodiment, the intermediate file format uses extensible markup language (XML) tags to store the client's collected information. FIGS. 12A and 12B show tags used in the preferred embodiment. FIG. 12C shows an example intermediate file format used to build a rich media file. A person skilled in the art will recognize that the tags of FIGS. 12A and 12B are merely representative, and other tags can be used to store the intermediate file format, and that an intermediate file format used to build a different rich media file will look different from FIG. 12C.

In another variation, the information of the rich media file can be streamed to the user. In the preferred embodiment, this variation is the most common delivery mechanism for rich media file. Codes are placed in a hypertext markup language (HTML) e-mail or web page where the client wishes the user to view the streamed rich media file. When the user opens the e-mail or page, the rich media file is streamed. In the preferred embodiment, the rich media file is streamed one page at a time after first streaming the embedded viewer. Thus, the first page is streamed from the remote server and is displayed while the next page is streamed in. Then the third page is streamed in, and so on. This optimizes use of the user's bandwidth: the user waits only long enough for the first page to load. Upon the first page loading, the remaining pages are then streamed.

Regarding the assembly of the information for the rich media file, the preferred embodiment employs a software package to assemble the information. The client positions images on the page as desired, adds text and links, selects the options, and so on. But this is not the only way to assemble the information. An alternative embodiment enables the client to use his preferred editing package, such as a word processor or other software. Then, when the information is properly assembled and formatted, a printer driver is used to complete the assembly of the information. The printer driver captures the contents and position of the information as if it was being printed to a printer, and translates that data into the intermediate file format used to design the rich media file. If the information spans multiple pages, the printer driver automatically adds links between the pages, saving the client some time (since no manual page linking need be done). The printer driver can capture an image placed in the background of the document for similar background treatment in the rich media file. The printer driver can also capture text and place the text in text boxes, allowing the client to go back and edit the information in the intermediate file format, rather than having to return to the original document from which the information was captured. A client may also print the entire information and images contained in the original document to the background of the intermediate file.

Rich media files are also capable of supporting timed animation. In timed animations, events happen at defined times following prior events. For example, in a presentation, the bullet point text or image objects can be set so that each bullet point displays five seconds after the previous bullet point displayed. Using timed animations gives the client additional flexibility in structuring the flow of the information in the rich media file and more rich animations in the rich media file by allowing the movement or actions of objects.

Enabling Search Results with Screen Snapshots

New users to the Internet almost double every other month. This fact gives rise to an enormous need to offer these less experienced users an easier way to use and search the Internet. The company site will be simple in design. No tricky animation or graphics will be needed, as we are interested in making the user's experience faster, easier and less confusing.

Though the site and related images seem similar to other sites, the internal technology is completely different. The company will have the worlds largest on line database, which will be custom developed to house both images of varying sizes as well as text descriptions of each company, site and Web page listing. These listings will then be group and indexed based on associated words, categories and listing descriptions. This database will be made up of the information used by ALL other major search engines as well as screen shots, keyword and page descriptions and the URL keyword information of each page of the site. This additional information found in the company site goes far beyond the competition listings consisting of Metatags from the Home page and 1 level down, and keyword listings only from the first level. The company site will categorize, keyword list and URL list ALL pages within each Web site.

As a part of upgrading a Web site listing, the site owner will be able to provide an image other than the FREE screen shot of their pages. Additionally, they will be able to provide optional listing descriptions and/or keyword lists of their site, which the user may opt to use rather than the standard "spider" provided information.

The Search Results:

The results of a search will be returned in one of three formats.

1) All images. Listings, which match or are similar to the users search criteria, will be shown in the form of images only. The images will be screen shots of each site, or 2) the default will be a combination of both text and screen shot images, or 3) text only, identical to all other major search engines. This capability makes searching much faster and easier by using pictures rather than words. Furthermore, there will be less of a need to surf to sites that are not what the user was looking for.

There are additional features that will improve the user search. These additional searches are described in more detail in further sections. Features such as Information and rich media files, e-mail Fax Forwarding, free e-mail, user services and other options will also be available. These services are designed to either directly generate revenue, or increase regular traffic to the site.

Additional Front Line Product & Service Details:

1) Where to Start: The most important first step of the development of the company is to quickly establish a database of URLs that is large enough to realistically be used by the consumer. This will be accomplished by outsourcing and subscribing to the services of the industry leader of search engine database information. The company provides the search engine index data to Yahoo!, Snap and AOL Search as well as many other major search sites. This allows the company to focus its efforts on the development of our own supplement data, while having the ability to roll out our services much more quickly.

In order to establish the database quickly, a "robot" or "spider" program will surf the Web, collect, analyze and store the desired information. Among other technical functions, the robot will do the following:

A) Surf the Web to find Web sites, Metatags, content and keywords, etc. It will also collect e-mail addresses from these pages in order to send invitations to site owners asking them to edit their text listing, keywords & categories. The robot will be programmed to get the number of pages at the site, and page titles to be included in the keyword listing.

B) Free listings will consist of text obtained from the companies' Web sites, as well as an image composed of a screen shot of each page. The robot will take a screen shot, compose a pre-determined image dimension, file size, resolution and file type. This information will be automatically saved to the search engine database for each FREE listing.

C) The system will track the text listings content and group and categorize them by their text and keywords, all with out the need for human intervention.

D) While this is occurring, the design, programming and development of the other products/services will commence. As the core products and services are coming on line the database will continually increase and become more effective.

Other data collection functions performed by the "robot":
1) Collect e-mail addresses found on each page
2) Obtain the number of pages at each site
3) Obtain all page titles to be included in keyword groups.
4) Robot browser to take 4 versions of a screen shot, each with a pre-determined image dimension, file size, resolution, color format, and file type.

2) Special Search & Result Capabilities: Along with the many other unique and proprietary features being offered, additional search and search result capabilities will be introduced to the public. These new options allow the user to effectively search and obtain results in seven different ways:

"Niche Options" {
Search Results Options:
A) Text Only Search Results (Current industry standard)
B) Image Only Search Results (New to the industry)
C) Text & Image Combined Search Results (New to the industry)
} "Platform"

Search Options:
D) Platform + Web Site Owner Defined Keywords (New to the industry)
E) Platform + User Services Profile (New to the industry)
F) Platform + User Services Profile & Site Owner defined Keywords (New)
G) Search by Keywords contained in the Domain Name (New)

H) Advanced Search Options (Current industry standard)

3) Key Technology Differences of the Search Engine:

A) 3 Terabytes will be the current leader and the Largest Online Database!

B) Search engine has three viewable options: Text, Text & Screen Shot of the Site, and Web Site Images only.

C) Initial site address searches are found using outside search engine hosts, allowing quicker access to most often used key word sites, while our Spiders build a unique database of Web Sites and screen shots.

D) Other "Image" search engine applications being developed (Image Surfer) are only looking for pictures of actual items (People, places, things.) and not Images of the Web Sites.

E) Search results can show sites accepting Secure Credit Card Purchasing or offering rich media files.

F) "Smart Assistant" helps with more specialized searches by suggesting sub-keyword recommendations.

G) Unique Search Spider creates database not only from IP's found but also through Reverse Lookup. Allowing for a more extensive database of Web Sites.

4) Key Safeguards and Redundancies:

A) Custom web browser used for viewing Web Sites when creating Images. Thus, less software or system crashes that would normally result with using the industry standard, bulky browsers.

B) 3 Terabytes Disk Arrays on line with a database of Site Images, while an identical back up system works on new Sites and Images. System switches daily or automatically if problem arises with the Disk Array on line.

C) Generator power supply in case of power outages, locally.

D) Sealed room with controlled environment to lesson wear and tear on the system.

E) Multi dedicated computers with redundant units for both Spider searches and Public search requests.

F) Off site duplicated database systems in case of failure of Internet at home location.

G) Custom spider software, allowing resolution of reverse lookup of IP's, and multi or broken thread handling.

H) Unique, Custom Merger and Transaction handlers to test IP's and internal changes prior to being made available to public viewers.

I) Internal online and printed operating manuals for quick start training of new or replacement employees.

J) Custom robot browser allows faster loads of each site page over traditional browsers.

K) Custom robot browser able to take higher resolution image of screen shot, in smaller file size.

5) Defining Search Options:

A) Web Site Owner Defined Keywords: Upon purchasing an image listing upgrade, a business customer will complete an on-line form. This form will give them the option of providing the company with keywords they would use to describe themselves. The user will then have the option to search on those keywords only, rather than through normal "robot" provided titles.

B) User Services Profile: Secure Credit Card Purchasing users register and provide detailed profile information about themselves. The user then has the option to allow the search engine to use their profile in its search function. I.e. being a single woman, with 1 child, renting, rather then owning her home, etc. could return a better or different search result.

C) Combination: A combination of the above A and B search options will provide the user with an additional means of finding the information they seek.

6) Detailed Statistics Tracking & Reporting:

Systems and technology enabling management as well as business customers the ability to track and report on all aspects of user traffic will be utilized. Links from image listings, banner ads, purchases and all other features used, will be collected for statistical analysis. One example of this benefit is the fact that these statistics will allow sales calls to companies with FREE image listings, giving both the company Sales Rep and the prospective customer facts about the effectiveness of their listing, thus creating additional selling opportunities.

Not only will the statistical data allow for numerous selling opportunities, it will also provide management key information regarding the usage of our products and services. Access to reports regarding viability and usage of the products/services help in identifying other niche opportunities and provide timely, traceable results of changes or enhancements. Tracking and housing historical data on all facets of our system is identified as a key priority.

Finally, our visual technology lends itself to perfect strategic partnerships with the likes of WebTV, AOL and other user access services targeted to the beginner or novice Internet user.

7) "Real-Time" Assistance:

As apart of User Services, users have access to receiving search help. User's may receive assistance "real-time" using a FAQ (frequently asked questions) section, the "Search Assistant" option that drills down search result categories, contact an e-mail Help Desk, receive on-line Chat guidance, or speak directly with one of our customer service agents via Telephone. On-line Chat and Telephone help will require users to register for User Services.

8) Back End:

The following systems are designed to handle the core requirements of searching, parsing, extracting, storing, and cataloging the web. Their primary purpose is to find all valid web sites and produce a graphical snapshot of the sites' "Home" and other Web pages. In addition, these processes will also be capable of collecting and processing meta-tags, keywords, description, and text of the same pages in the future.

Scheduler Process

This processes main function is to coordinate Resolver activity to the URL data table. It determines what URLs in the URL data table need to be resolved; when a request to resolve is received from a Resolver process, the Scheduler shall give the requesting Resolver the URL in most need to be resolved.

In addition to coordinating the Resolvers, this process has the ability to seed the URL data table with a list of URL's supplied through an administrator interface.

When this process is not seeding the URL data table and it is not scanning for old URL's, it will poll all raw TCP/IP addresses for sites that do not have any detected links to it. This functionality shall have the ability to be enabled or disabled and has a low priority. Once a web page is found in this manner, a reverse lookup is performed on the IP and this URL will then be added to the URL data table.

The URL resolve need is based on the following criteria, in the order specified.

1. Unresolved seed URL's
2. IJRL's older then a predefined age.
3. Unresolved non-seed URL's Resolver=Spider/Robot Feeding imager process finding URL's queue all into list & pass to imager.

This process shall run on multiple machines at the same time. Its job is to get an address from the URL database that is currently not resolved and resolves it. This is essentially a multi-threaded Internet spider/robot. This program may run on multiple machines if the need arises. The resolution process can parse meta-tags on a page, place the tags into the key word data tables, and then queue a request to the imager process. If an error occurs stating that the page no longer exists, the URL in error shall be added to the tile Sweeper to later clean up. NOTE: The Imager process will only be queued to if a URL is a valid page.

Custom Merger Process

The merger process handles the requesting and merging of the external search data (Inktomi) with the custom image Search results. This merged information is what shall be returned to the user. The Company's Web Designers have access to tile information from this process via CGI utilities.

Transaction Handler Process

All writes and modification that are performed on any of the Data Tables shall be funneled through this process, which shall be run on the disk servers. Its primary function is to ensure data table integrity and log each and every transaction. By logging each transaction, it is possible to reconstruct a data table backup from a known past point to current. This feature allows an administrator to swap the data tables (through the Administrator Utilities) used by the web serving clients and the data tables being updated by the Resolver process. (The Transaction handler process manages switching back and forth from on-line database.)

Sweeper Process

The Sweeper Process is responsible for the removal of old, incorrect or inactive URLs from the URL data table and the Key data tables. It receives all of its Instructions via the sweeper queue from the Resolver and Scheduler processes. This process is a low priority process and can be configured to run only during times of low access.

Imager

This process interfaces to a commercially available or custom developed HTML GUI web browser. The process requests the browser to download a requested URL, then when complete, it takes a screen shot image of the web page. The image is stored as a file and the URL is modified in the data table to reference this image. The initial push for image collection will incorporate a commercially available browser as a streamlined custom browser is developed. The custom browser will not have the "user" features associated with the commercial browser, thus have less options and code to cause crashes, etc.

Text Search Entire Web

This component will be added to the Resolver task to handle extracting key words from the actual text from each web page processed. After time, this process can eventually eliminate the need for an external search engine and database (Inktomi).

Data Tables

Due to the vast amount of data necessary to process and store, a standard commercially available database does not have the ability to reliably save and retrieve information under a high system load. In addition the overhead of a standard database on potentially billions of records can be extreme in both space and time. To handle this data, streamlined data files and database application, software & hardware is being designed to efficiently handle this load and reliability issues.

URL Data Table

Tracks unique URL's in database.

A binary, fixed size record oriented file that contains one record per unique URL. In addition to this file, two other sibling tiles exist that index this tile by URL and page age. Design includes utilities to handle creating and maintaining sibling index files.

Key Word Data Table

Joins each keyword file together from a search.

There shall be one Key Word data file per found key word. This file shall contain one entry per URL found to contain the key word. This file shall be sorted (index) by page age.

Category Data Table

The category data table is a variable sized record oriented tile that contains administrator defined categories and associated key words.

Client Data File

The client data file is a variable size record oriented file that contains client profile information and client defined keys for the client's Web site.

Image Data Store

This is a combination of index files and individual image files and is used to hold and organize a large volume of images.

Web Based Administrator Utility

The Administrator Utility is a collection of reports and utilities used to analyze hit and search statistics, handle data table maintenance, and analyze the collection of systems for general health and well-being.

The following is a list of functions that is supported by this utility.

a) Reports
1) Client statistics
2) Hit Statistics
3) Search statistics
b) Data Table Utilities
1) Delete
2) Purge
3) Swap Data Tables
4) Re-Index
5) Backup
c) Process Utilities-maintaining function
1) Stop
2) Start & restart multiple processes
d) Category Definition Utilities
1) Define with key words associated
2) Delete
3) Rename
4) Modify key words associated
e) Client Utilities
1) Add Client
2) Remove Client
3) Modify Client
f) System Health Screen Web Based Client Utility Gives the client the ability to Modify and/or view their profile and URL custom key words. This is a collection of CGI utilities.

Web Based Client Sign-Up Utility

Image upgrade (e-mail possible-browser preferable.)

Gives a new client the ability to sign up for services. This is a collection of CGI utilities.

The initial solution incorporates 6 Terabytes of Online Storage, which is scalable. It is anticipated that this storage will be split into 3TB sections. This will enable 3TB to be used for Web Read Only access and 3TB to be used for the spider robot updates.

There are several "completely separate" ventures that will be deployed later. Some or all of these separate ventures will be marketed heavily, capture additional market share, generate profitable income, as well as allow for a less obvious way to push users to the company. Of the Cross-Market Ventures you will see, there are only a distinct few that require immediate deployment and roll out after the above products/services. These support ventures include:

Searchable Classified Newspaper Advertisements: National Newspaper Classified listings that are searchable. The service would also allow users to request key word notifications, providing them e-mail announcements when ads contain their interested items. The service would allow searches by state, region and national newspapers.

Magazine/Newspaper Listing and Purchasing Site: The user could search based on categories, names and/or industries, and the publications could easily market themselves at the site.

Secure Credit Card Purchasing & User Services:

User Services registration is designed to register users to receive an ID number to simplify requesting rich media files, allow on-line purchasing without passing any credit card information over the Web, and other unique benefits and services.

By entering their ID number and password there will no longer be a need to input all of their information every time a rich media file is requested. This will make requesting and receiving a rich media file even faster and easier.

The User Services registration process will facilitate a collection of specific demographic and other information about the user like Age, Income level, Employment Industry, etc. This valuable information will then be used for target marketing other products and services, unrelated to the company site, as well as search integration to better target results and for banner ad placement directed to the specific users' profile, such as likes, dislikes, and success tracking.

To register for on-line purchasing without passing any credit card information over the Web, a user elects to have the Secure Credit Card Purchasing option included with their User Services Benefits. Users mail, call or fax their credit card information for archiving in a secure "off-line" database located at the company site. In this way, the user's credit card information is not transmitted over the Internet. Alternatively, if users are comfortable with Internet security, users can enter information at secure servers while registering online.

Once registered with User Services, a user can use his/her profile in their searches. Integrating user profiles into search may improve user searches or better narrow the results. User profiles will also allow banner ad targeting and/or placement that is directed to specific user profiles.

It is important to note that both audience size and statistical profile information determine most advertising rates. Increasing User Services registrants and gathering user profiles becomes key to maximizing value and marketability to selling advertising space to our corporate customers. Supply and demand dictates that the more valuable our end user is to our customers, the more our user will be targeted, and the more the company can charge for marketing to them.

The company's strategy regarding e-commerce is to obtain a small piece of a large number of purchases on the Internet, rather than to compete as a "seller" of goods and services to our users. The Secure Credit Card Purchasing feature allows a user to purchase goods or services from anywhere on the Internet without having to transfer credit card information over the Internet. The user would include, or later add their credit card information in their User Services registration once, for secure archiving. Information can be provided via telephone, fax or secure servers online. When purchasing on the Web, the user would select Secure Credit Card Purchasing rather than MasterCard or Visa to pay for their purchase, and only enter their ID number and password. This would route the businesses order system to link out to the company site with the customers order amount, and our credit card merchant account would authorize the users credit card found in the User Services off-line database record. Upon authorization, codes would be returned back to the business, and the user's order would be confirmed. Finally, the source site would send that business a check for orders made with Secure Credit Card Purchasing accounts. Enticements for businesses to sign up will include a listing in our Secure Credit Card Purchasing business "Yellow Pages" of companies offering the Secure Credit Card Purchasing option, as well as discounted company site listings and/or banner advertising.

Secure Credit Card Purchasing:

1) User selects Secure Credit Card Purchasing rather than MasterCard or Visa to pay for purchase.

2) Secure link is made to Secure Credit Card Purchasing secure servers via a new window.

3) Users are prompted to input their Secure Credit Card Purchasing ID and password.

4) System to collect sale amount, user ID/password and business ID for authentication.

5) Via the secure link, system to authenticate user and business.

6) Off-line system to check database for authenticated users credit card information.

7) Credit card authorized via a standard, bank merchant account system/software by off-line database system.

8) Upon bank approval of credit card and amount, the system to accept and database authorization code from bank in a transaction table along with users ID, dollar amount and businesses ID.

9) Transaction table systems to assign new Secure Credit Card, proprietary authorization codes to the transaction and include it with the other detail of the transaction.

10) New Secure Credit Card proprietary authorization codes in the off-line database to be delivered to the on-line system connected via the secure link for that transaction.

11) Authorization code to be delivered to database system provided to the merchant by Secure Credit Card Purchasing company, or to connect directly into their existing bank card processing system and attach the code for that transaction.

12) Merchant's system approves method of payment and authorizes purchase from user exactly as other systems do now.

13) Secure Credit Card Purchasing company accounting to send periodic checks to Merchant.

Additional User Options in using Secure Credit Card Purchasing:

Option 1: More secure feature, which at the time the order is approved by the bank, the system sends e-mail receipt to user with transaction detail. (Inserted at step 8) Upon delivering e-mail, transaction completes as normal.

Option 2: Feature to be used with Option 1. System not to complete transaction until receipt of users electronic approval, by replying to the e-mail sent by the system.

Advantages of Secure Credit Card Purchasing:

1) Opens a much larger universe of users now willing to buy on the Internet, thus giving our business clients a direct avenue to that consumer segment.

2) Smaller e-businesses could accept orders from consumers that want to pay with a credit card.

3) No need for extensive e-commerce knowledge, special technical staff for programming, secure servers and extensive capital.

4) User gets the benefits of purchasing on the Internet without the risk of credit card or information fraud.

5) Faster purchasing due to less information to input.

Additional opportunities capitalizing on User Services registrants consist of engaging in contractual agreements with corporations conducting, Import/Export, Major Retail, Wholesaling, Software Manufacturing, etc., in order to offer our customers GREAT deals on overstocked, out of date, or slow moving products. Announcements via e-mail describing these and other offers would be sent to our User Services registrants. These announcements would be similar to the "Home Shopping Network", in that only a specific quantity of each product would be available at the special prices, and only for a specified amount of time. Offering products with limited quantity and time constraints facilitate a quick decision by the consumer, thus impulse buying. Subsequently, the company would be able to move product volume for our contracted partners, provide savings benefits to our users, without a need to stock merchandise, carry overhead and ship product. This service would serve as an intermediary between the product companies and our User Services customers, while getting compensated on a percentage of revenues generated. Finally, the excitement and incentives of this service will create user referrals, which will increase the overall user base dramaticaly.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

The invention claimed is:

1. A network search platform, comprising:
a spider structured to surf a network, to collect textual information of at least one webpage of at least one website of the network, and to store the textual information in a database;
a robot browser structured to take at least one snap-shot image of the at least one webpage;
resolution means for parsing the textual information and queuing a request to the robot browser to take the at least one snap-shot image responsive to the textual information of the at least one webpage;
user selectable options configurable to provide first search results responsive to keywords entered by at least one user of the network, the first search results to show at least some of the textual information of the at least one webpage; and
user services configurable to collect demographic information of the at least one user of the network, wherein the user selectable options are further configurable to provide the first search results responsive to the demographic information.

2. A network search platform according to claim 1, wherein the user selectable options are further configurable to provide second search results to show only the at least one snap-shot image of the at least one webpage.

3. A network search platform according to claim 2, wherein the user selectable options are further configurable to provide third search results to show the at least one snap-shot image of the at least one webpage and at least some of the textual information of the at least one webpage.

4. A network search platform according to claim 3, wherein the search platform further comprises:
keywords defined by a website owner to describe the at least one website, wherein the website owner is different from the at least one user; and
a smart assistant to help specialize the first, second, and third search results by suggesting sub-keyword recommendations to the at least one user.

5. A network search platform, comprising:
a spider structured to surf a network, to collect textual information of at least one webpage of at least one website of the network, and to store the textual information in a database;
a robot browser structured to take at least one snap-shot image of the at least one webpage;
resolution means for parsing the textual information and queuing a request to the robot browser to take the at least one snap-shot image responsive to the textual information of the at least one webpage;
user selectable options configurable to provide first search results responsive to keywords entered by at least one user of the network, the first search results to show at least some of the textual information of the at least one webpage;
wherein the user selectable options are further configurable to provide second search results to show only the at least one snap-shot image of the at least one webpage;
wherein the user selectable options are further configurable to provide third search results to show the at least one snap-shot image of the at least one webpage and at least some of the textual information of the at least one webpage;
user services configurable to collect demographic information of the at least one user of the network;
keywords defined by a website owner to describe the at least one website;
a smart assistant to help specialize the first, second, and third search results by suggesting sub-keyword recommendations to the at least one user; and
wherein the user selectable options are further configurable to provide fourth search results to show at least one of the first, second, and third search results responsive to the demographic information of the at least one user and responsive to the website owner defined keywords.

6. A network search platform according to claim 5, wherein the user selectable options are further configurable to provide fifth search results to show at least one of the first, second, and third search results responsive to said keywords contained in a domain name of the at least one website.

7. A network search platform, comprising:
a spider structured to surf a network, to collect textual information of at least one webpage of at least one website of the network, and to store the textual information in a database, wherein the database is structured to automatically switch to a back up database responsive to a failure;
a robot browser structured to take at least one snap-shot image of the at least one webpage;
resolution means for parsing the textual information and queuing a request to the robot browser to take the at least one snap-shot image responsive to the textual information of the at least one webpage;
user selectable options configurable to provide first search results responsive to keywords entered by at least one user of the network, the first search results to show at least some of the textual information of the at least one webpage;
a scheduler structured to perform a reverse lookup of at least one internet protocol (IP) address to identify at least one uniform resource locator (URL), and to add the at least one URL to the database;
a resolver structured to parse the textual information associated with the at least one URL responsive to the scheduler;
a logger structured to log transactions of the database and to reconstruct the database responsive to the failure; and
a sweeper structured to run at a low priority and to remove at least one inactive URL from the database.

8. A network search platform according to claim 7, wherein the scheduler is structured to seed the database with the at least one seeded URL responsive to an administrator interface, and wherein the resolver is structured to parse the at least one seeded URL prior to parsing the at least one URL.

9. A network search platform according to claim 8, wherein the robot browser is structured to not take the at least one snap-shot image responsive to the removal of the at least one inactive URL.

10. A network search platform according to claim 8, wherein the administrator interface is structured to analyze search statistics, to monitor a well-being of the network, and to maintain the database.

11. A method for enabling search results including screen snapshots, the method comprising:
visiting a web site on a network;
collecting search terms from the web site;
taking a screen snapshot of the web site;
storing the search terms and screen snapshot in a database;
receiving a search query from a user;
searching the database to respond to the search query, thereby locating the web site;
providing the user with search results based on the search terms, wherein the search results include:
a link to the web site; and
the screen snapshot of the web site;
collecting demographic information of the user, the demographic information including age, income level, and employment history; and
targeting an ad placement and targeting the search results to the user responsive to the demographic information.

12. A method for enabling search results according to claim 11, wherein collecting the search terms from the web site includes resolving at least one uniform resource locator (URL), and wherein taking the screen snapshot includes queuing a request to an imager to take the screen snapshot responsive to the resolving.

13. An article comprising a non-transitory tangible machine-accessible storage medium having associated data that, when accessed, results in a machine:
surfing a network to collect textual information of at least one webpage of at least one website of the network;
storing the textual information in a database;
parsing the textual information;
queuing a request to take at least one snap-shot image responsive to the textual information of the at least one webpage;

taking the at least one snap-shot image of the at least one webpage;

displaying user selectable options configurable to provide first search results responsive to keywords entered by at least one user of the network, the first search results to show at least some of the textual information of the at least one webpage; and collecting demographic information of the at least one user of the network, the demographic information including age, income level, and employment history, and targeting an ad placement to the at least one user responsive to the demographic information.

14. An article according to claim 13, wherein the user selectable options are further configurable to provide second search results to show the at least one snap-shot image of the at least one webpage and at least some of the textual information of the at least one webpage.

15. A network search platform according to claim 4, wherein the spider is structured to automatically collect e-mail addresses included in the at least one website and to automatically send an email invitation to the website owner to update said keywords.

* * * * *